United States Patent

[11] 3,568,186

[72] Inventors Wayne G. Shear
  Pompano Beach, Fla.;
  Merlin E. Olmstead, Baltimore, Md.;
  Samuel Roger Everett, Ft. Lauderdale, Fla.
[21] Appl. No. 780,729
[22] Filed Dec. 3, 1968
[45] Patented Mar. 2, 1971
[73] Assignee The Bendix Corporation
  Fort Lauderdale, Fla.

[54] EXTENDED RANGE CLOCK SYNCHRONIZATION FOR COLLISION AVOIDANCE SYSTEM
  11 Claims, 4 Drawing Figs.
[52] U.S. Cl. .................................................. 343/6.5, 343/7.5
[51] Int. Cl. ...................................................... G01s 9/56
[50] Field of Search ............................................ 343/6.5, 6.5 (LC), 7.5, 112.4

[56] References Cited
UNITED STATES PATENTS
3,250,896 5/1966 Perkinson et al. ............ (343/112.4)
3,262,111 7/1966 Graham ......................... 343/7.5

Primary Examiner—Rodney D. Bennett, Jr.
Assistant Examiner—Malcolm F. Hubler
Attorneys—Plante, Arens, Hartz, Hix and Smith, William G. Christoforo, Lester L. Hallacher and Bruce L. Lamb ABSTRACT: Apparatus for synchronizing clocks within a cooperative collision avoidance network wherein an aircraft after operating in an isolated environment for a predetermined time sets its clock in a standby position and listens for start of epoch signals. Upon hearing a start of epoch signal the aircraft immediately starts its clock and begins counting epochs and the time slots contained therein. During own time slot, as determined by its clock, the aircraft transmits a clock synchronization request. If no synchronization responses are received the aircraft will automatically advance its clock by a predetermined amount and once again transmit a synchronization request during its next time slot. If a synchronization response is now received the aircraft will synchronize its clock taking into account the amount of time by which its clock had to be advanced in order to receive the synchronization response. If no response is received the aircraft automatically returns its clock to the standby condition.

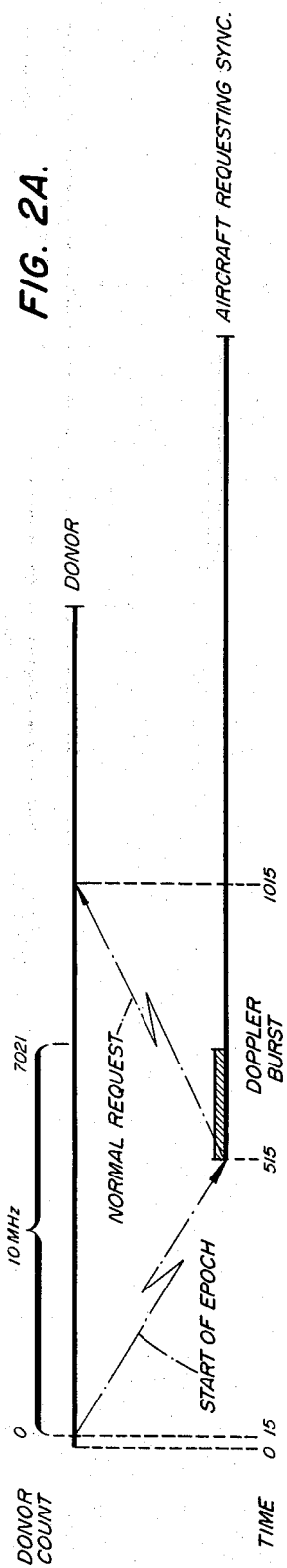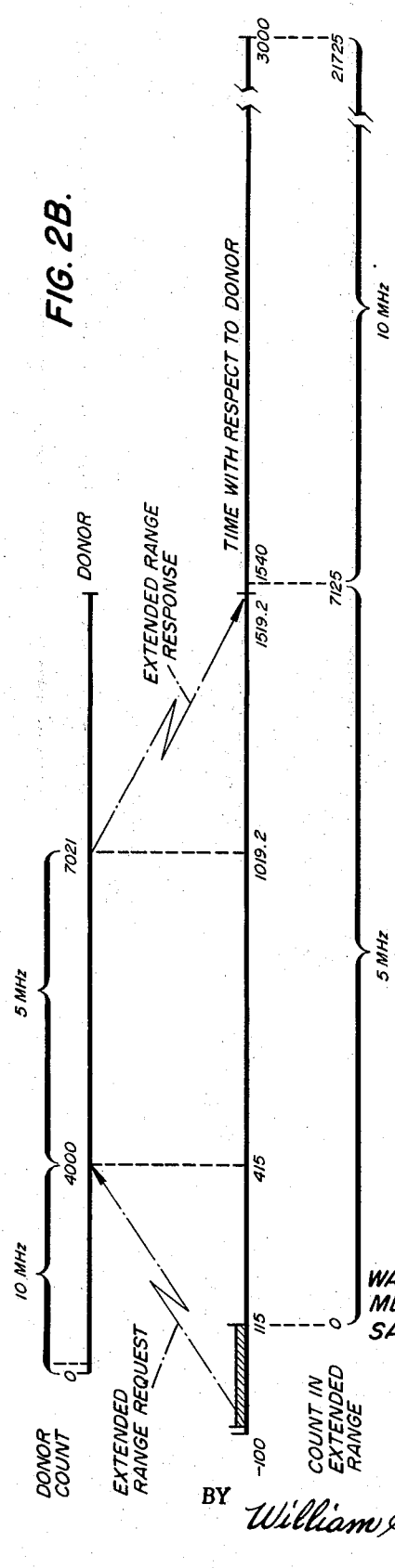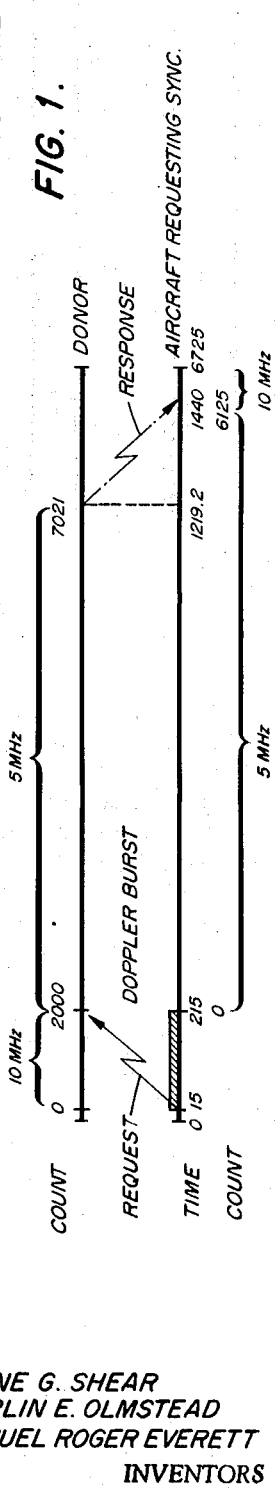

EXTENDED RANGE CLOCK SYNCHRONIZATION FOR COLLISION AVOIDANCE SYSTEM

CROSS REFERENCES TO RELATED APPLICATIONS

Reference is made herein to the Patent application titled "A Frequency Diversity Time Multiplex Means for Increasing the Capacity of a Cooperative Collision Avoidance System," Ser. No. 694,239 filed Nov. 29, 1967 by W. G. Shear et al. and which is owned by the assignee of the present invention.

BACKGROUND OF THE INVENTION

This invention relates to means for synchronizing collision avoidance system clocks and more particularly to means for synchronizing the collision avoidance clock aboard an aircraft returning from a remote location to the vicinity of a collision avoidance network whereby the clock may be started and synchronized while the aircraft is at an extended range from the collision avoidance network.

A collision avoidance system utilizing so-called Master Time techniques has been proposed. In this system each cooperating aircraft is equipped with a collision avoidance station including an accurate clock, which includes either an atomic or a very accurately controlled crystal oscillator, and a counter for counting the oscillations therefrom and which is synchronized with all other airborne station clocks in a given collision avoidance network and which also may be synchronized with a master ground clock. The collision avoidance network is structured as follows. Real time is divided into system epochs with the epochs being further divided into time slots, with each time slot being assigned to a different aircraft within the collision avoidance network. During its assigned time slot, an aircraft station transmits on a frequency assigned to that time slot and which frequency is accurately known to all other aircraft in the collision avoidance network, a collision avoidance message which includes as a minimum, a relatively long frequency burst, known as the Doppler burst, which starts at a precise time with respect to the beginning of the time slot, and an altitude pulse whose position with respect to the Doppler burst is correlative to the altitude of the aircraft. Other information may be included in the message, for example, an altitude rate pulse whose position with respect to the Doppler burst is correlative to the altitude rate of the aircraft; however, it is not necessary for an understanding of the principles and embodiment of the present invention to consider the complete content of the collision avoidance message.

The epochs are further divided as to time into odd and even epochs with the odd epochs being called ground epochs and the even epochs being called air epochs. In the first time slot of the ground epoch each ground station transmits a unique coded pulse triad identifying this epoch as a ground epoch. Ground stations operate on a single world wide time and their time is considered to be absolutely correct time. During the first time slot of the even epochs each cooperating aircraft station transmits a different unique pulse coded triad identifying this epoch as an air epoch. During odd epochs a ground station treats each collision avoidance message which it hears as a synchronization request and responds during that time slot with clock synchronization information. During the air epochs, each aircraft station treats each collision avoidance message which it receives as a synchronization request and may respond thereto.

In the known collision avoidance system time slots are 1500 microseconds long with 2000 time slots comprising a system epoch so that a system epoch is 3 seconds long. The Doppler burst, which as has been mentioned is transmitted by a cooperating station during its time slot, is 200 microseconds long with transmission of this pulse commencing 15 microseconds after the start of own time slot. Although, in this collision avoidance system, collision avoidance messages are transmitted one way, synchronization requests are two way transmissions. The Doppler burst which each station transmits during its time slot is a synchronization request. The manner in which the clocks are synchronized is well-known to those skilled in the art; however, it will be discussed briefly below during the description of the preferred embodiment with reference to FIGS. 1 and 2. However, it should be realized that when the clocks in two stations are closely synchronized, the range between the clock requiring synchronization and the clock will which will contribute synchronization information must be such that the synchronization request is received at the donor station before the midpoint of the time slot. When taking into account the time required to generate and decode the synchronization request and response signals it is apparent that in a practical system the synchronization requests must arrive at the donor some time prior to the midpoint of the time slot. For closely synchronized clocks the maximum range between stations at which a synchronization response can be obtained is in the neighborhood of 98 miles. For clocks which are not closely synchronized, such as would be the case when an aircraft is returning from a remote location, the range at which synchronization responses can be expected becomes even less. It is, of course, desirable that an unsynchronized clock become synchronized to network time as soon as possible.

SUMMARY OF THE INVENTION

It is thus an object of this invention to provide a means for starting and synchronizing a collision avoidance system clock which is installed on an aircraft equipped with a collision avoidance station, which aircraft is returning from a remote location into a collision avoidance network.

It is another object of this invention to provide a synchronization means of the aforementioned type which will additionally provide such synchronization when the aircraft reentering the collision avoidance network is at an extended range from the collision avoidance network.

It is a further object of this invention to provide a synchronization means of the type described which is fully compatible with known aircraft collision avoidance systems.

These and other objects of this invention will become apparent to one skilled in the art by a reading and comprehension of the following description of the preferred embodiment and claims.

As has been mentioned, an airborne station which is out of range of synchronization influences will have its clock quality slowly deteriorate. A predictable time after the clock has last been synchronized clock synchronization will have so deteriorated as to make any collision avoidance judgments based on that clock time unreliable. It thus becomes desirable to return the clock and station to a reset state wherein the station ceases to transmit collision avoidance messages and remains in a standby receiving mode waiting for synchronization information. In the aforementioned Pat. application Ser. No. 694,239, entitled "A Frequency Diversity Time Multiplex Means for Increasing the Capacity of a Cooperative Collision Avoidance System," there was described a frequency diversity system whereby the frequency in adjacent time slots was changed on a predetermined schedule in order to prevent radio interference between the time slots. This last patent application describes how the start of epoch signals, whether transmitted by a ground or airborne station, are transmitted at a frequency $f_1$. The synchronization signals for which a station in a standby mode is searching is the start of epoch signal, either ground or air, so that the station, while in the standby mode, must listen on frequency $f_1$. Upon arrival of a ground or air start of epoch signal the station and clock are started automatically, thus coarsely synchronizing the clock to the responding clock. The clock, since it was started by the arrival of the start of epoch signal, is in error by an amount equal to the range transit time from the station providing the start of epoch signal.

Having now been started and coarsely synchronized the station during own time slot as determined locally transmits a synchronization request. The remainder of the collision avoidance message may be suitably suppressed until the clock is fine synchronized to prevent misinterpretation of its collision avoidance message. If a synchronization response is received during own time slot the clock is fine synchronized and thus returns to normal operation. If, however, no synchronization response is received during own time slot it can be assumed that the range between the clock requiring synchronization and a donor clock is too great. Although it is reasonable to expect to receive synchronization responses at a range of 98 miles, if the clock is synchronized, it is impossible to receive fine synchronization signals where the clock has been started as described if the range between the clock requiring synchronization and the donor clock is in excess of 48 miles when using conventional synchronization techniques.

Since it is known that the clock requiring synchronization lags the donor clock by signal transit time between the two stations, the probability of the coarsely synchronized clock receiving synchronization responses can be increased by advancing the coarsely synchronized clock, so that its station transmits its synchronization request at an earlier than normal time, and by increasing the length of own time slot in order to receive synchronization responses transmitted by donor clocks which are at extended ranges which responses might otherwise arrive at the coarsely synchronized clock after completion of own time slot.

BRIEF DESCRIPTION OF THE DRAWINGS

FIG. 1 is a time plot of the time slots of a clock requesting synchronization and a donor clock when both are synchronized and the transit time between clocks is 200 microseconds.

FIG. 2a is a time plot of the time slots of a newly started clock requesting synchronization and a donor clock with transit time between clocks of 500 microseconds.

FIG. 2b is a time plot of the time slots of the clocks of FIG. 2a but after the clock requesting synchronization has advanced its time.

DESCRIPTION OF THE PREFERRED EMBODIMENT

Figure 3:
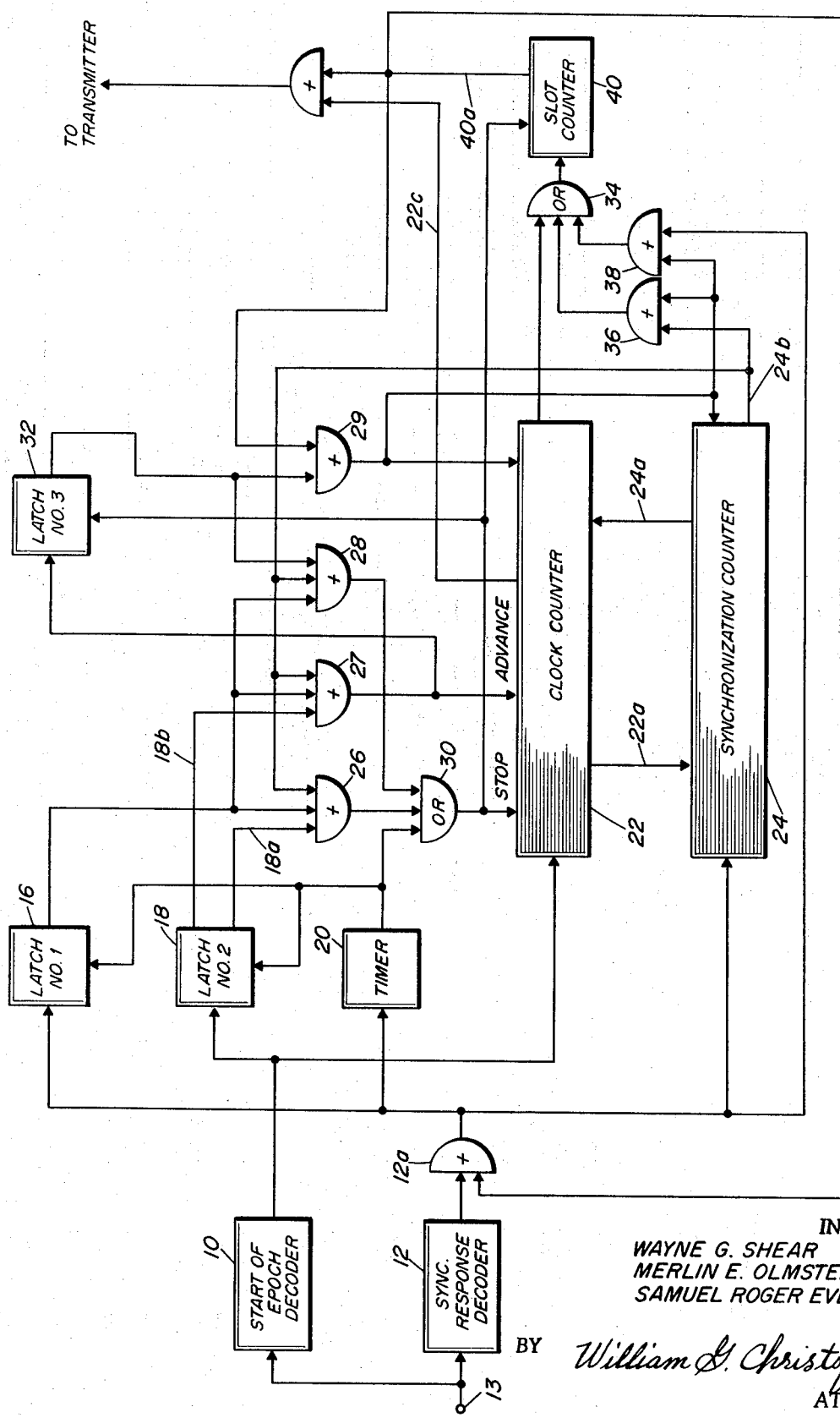
FIG. 3 is the block diagram of this invention.

Referring to FIG. 1, an airborne station requesting synchronization transmits 15 microseconds after the start of own time slot a 200 microsecond long Doppler burst, which, as has been mentioned, also serves as a synchronization request. It has been assumed in FIG. 1, for the sake of illustration only, that the station requesting synchronization and the donor are synchronized and that the transit time therebetween is 200 microseconds. The donor, 15 microseconds after the start of this time slot, starts counting pulses at a 10 mHz rate in a synchronization counter. Upon arrival of the Doppler burst at the donor, the synchronization counter changes speed and starts to count pulses at a 5 mHz rate. When the synchronization counter accumulates a count of 7021 the donor transmits a unique triad signal which comprises the synchronization response and which is received by the clock requesting synchronization 200 microseconds later since transit time for this example has been assumed to be 200 microseconds. Taking into account the time required to decode the triad (20.8 microseconds), the station requesting synchronization recognizes that it has received a synchronization response 1440 microseconds after the start of own time slot. During this time the station requesting synchronization has started to count pulses at a 5 mHz rate in its synchronization counter immediately after its transmission of the synchronization request, that is, at 215 microseconds after the start of own time slot. Upon recognition of the synchronization response at the station requesting synchronization, it changes the speed of its synchronization counter to 10 mHz and counts to a total of 6725 counts at which time it recognizes the end of own time slot and synchronizes its clock therewith. Where the station requesting synchronization and the donor are exactly synchronized, as in this example, the synchronization response will be received and decoded at the station requesting synchronization at a time slot time of 1440 microseconds regardless of the range between the donor and the station requesting synchronization.

Assume now that an intruder station in the standby mode enters the vicinity of a collision avoidance network and at a range corresponding to a transit time of 500 microseconds (approximately 93 miles) the intruder entering the network hears a start of epoch signal and starts its clock. Referring now to FIG. 2 it can be seen that the clock on the intruder lags the donor clock by the transit time plus the time required by the intruder station to decode the start of epoch signal, which for the purpose of this embodiment is assumed to be 15 microseconds so that the total lag of the intruder clock behind the donor clock is a total of 530 microseconds which includes signal transit time, start of epoch signal decoding time and the 15 microsecond delay in transmitting the start of epoch signal. Of course, since it is known that 15 microseconds is required to decode a start of epoch signal and that the epoch start signal was transmitted at donor slot time 15 microseconds, the clock can be biased when started to compensate therefor so that the total lag in this case would be 500 microseconds, which is the transit time. This biasing is suitably and simply accomplished by stopping and resetting the clock to 30 microseconds slot time in the standby mode. However, for a full understanding of the invention it is not necessary to describe a particular means to be used for clock biasing. Having described the rationale and the means generally for clock biasing above, the implementation thereof should now be obvious to one skilled in the art.

To continue, during own time slot the station requesting synchronization transmits only its Doppler burst, which is received at the donor at the donor's time slot of 1015 microseconds which, having biased the requesting stations clock by 30 microseconds, is simply twice the transit time plus the 15 microsecond delay in transmitting the synchronization request (Doppler burst). Since the donor started his synchronization counter at time slot time 15 microseconds and has been counting at a 10 mHz rate since that time it has since counted to 7021 counts and having received no synchronization request thus will transmit no synchronization response during this time slot. The clock requiring synchronization can thus not obtain synchronization information at this range with this amount of missynchronization between clocks. The station requesting synchronization recognizing that it has not obtained synchronization now advances its time by a fixed predetermined amount, which in this embodiment is 600 microseconds so that it is actually now running 100 microseconds ahead of the donor clock. During the next system epoch at a time of minus 85 microseconds with respect to this particular time slot at the donor, the station requesting synchronization transmits the Doppler burst which arrives at the donor 500 microseconds later or at a slot time 415 microseconds with respect to the donor. At this time the donor synchronization counter has counted to 4000, it then changes speed and counts, as aforementioned, to 7021, or 3021 more counts at a 5 mHz rate. At the donor's time slot time of 1019.2 microseconds the donor's synchronization counter reaches the 7021 count and the donor thus transmits the synchronization response which, assuming the 500 microsecond transit time and a 20.8 microsecond time period required to decode the synchronization response triad, means the clock requesting synchronization recognizes that it has received a synchronization response at a time 1540 microseconds with respect to the start of donor's time slot. At the time the clock requesting synchronization advanced its clock by 600 microseconds it also advanced the number to which the synchronization counter will count from 6725 to 21,725 at which time it would synchronize its clock to donor's clock. The number 21,725 is equal to the original count required (6725) plus 15,000 counts at a 10 mHz rate for an extra slot. Thus, when the synchronization response is received at the clock requesting synchronization at time 1540 with respect to the start of donor's time slot the synchronization counter on the clock requesting synchronization changes speed and now counts an additional 14,600 counts at a 10 mHz rate until the count 21,725 is reached. This corresponds to a slot time with respect to the donor of 3000 microseconds, which of course, is the length of two time slots. The clock requesting synchronization, having recognized that it has advanced its clock and extended its time slot is now able to synchronize itself exactly with the donor.

Referring to FIG. 3 there is seen a main counter, comprised of the clock counter 22 and slot counter 40, and a synchronization counter 24, both of which elements are known in the art. Briefly, counter 22 comprises an accurate oscillator and a binary counter which generates a slot pulse at the completion of each time period equal to a time slot along with means responsive to signals generated by synchronization counter 24 to synchronize the phase of the clock. The binary counter additionally includes gates which, in response to various signals will advance the count of the counter by a predetermined number of counts and will extend the number of counts required to produce a slot pulse. Slot counter 40 counts the slot pulses and thus keeps track of the odd and even epochs, the time slots therein and this particular aircraft's own time slot.

Synchronization counter 24 also comprises a binary counter driven by the accurate clock, but having the characteristic ability of being able to count at full or half speed. This is accomplished, briefly, by applying the clock pulse either to the first stage of the binary counter to accomplish half speed counting or to the second stage of the binary counter to accomplish full speed counting through gates which are responsive to various other externally applied signals.

Assume now that clock counter 22 has been properly started and synchronized to world wide time and is properly counting. Assume additionally that slot counter 40 is properly counting the system epochs and the time slots. Fifteen microseconds after the start of own time slot clock counter 22 sends a signal along the line 22c through gate 42, which is qualified during own time slot by the signal on line 40a by slot counter 40, to a transmitter which is thus triggered to transmit a 200 microsecond long Doppler burst which comprises the first part of the collision avoidance message as previously described. The transmitter immediately thereafter also transmits information concerning own aircraft altitude and altitude rate, the means for effecting this transmission being well-known in the art. Additionally, at the end of the 200 microsecond Doppler burst, which corresponds to a slot time of 215 microseconds, clock counter 22 sends a start signal to synchronization counter 24 along start line 22a. Synchronization counter 24 in response thereto begins to count at half speed, which as has been explained is the speed of 5 mHz.

The collision avoidance message which is transmitted will be received by all cooperating aircraft within range and decoded for its collision avoidance message informational content. Additionally, if this is an odd or ground epoch any ground station receiving the collision avoidance message will treat the message as a synchronization request and respond accordingly. If this is an even or air epoch a cooperating aircraft within range will treat the message as a synchronization request. If a synchronization response is transmitted by a cooperating station it will be received by a system receiver (not shown) and demodulated with the video output being applied to terminal 13. Decoder 12 recognizes the received synchronization response and signals synchronization counter 24 through gate 12a which is qualified by the own slot signal on line 40a to change speed to the full or 10 mHz rate. When counter 24 has counted to 6725 it applies a signal along line 24a to synchronize counter 22, as explained earlier. Gate 12a output signals are also applied to reset timer 20 which includes a low frequency oscillator and a digital counting circuit. When counter 20 counts to a predetermined maximum a signal is applied through Or gate 30 to reset and stop clock counter 22 at the beginning of a time slot (or to some other point in the time slot if counter bias, as described earlier, is applied) and additionally to reset slot counter 44 to the beginning of a system epoch. The time required for counter 20 to count to its predetermined count is the predicted time that clock counter 22 will remain reliable for collision avoidance message deciphering without being externally synchronized. Since this period normally extends over many system epochs and synchronization responses are received normally during a large percentage of system epochs it can be seen that this system must be out of range of a collision avoidance network for an appreciable period of time before counter 20 will generate the output to stop and reset clock counter 22 and slot counter 40.

Assuming now that this aircraft has been out of touch with a collision avoidance network for a sufficient period of time for counter 20 to count to its predetermined count and reset and stop counter 22 and slot counter 40. Also assume that thereafter the aircraft approaches the vicinity of a collision avoidance network and receives a start of epoch signal at a range of 93 miles from the donor which, it will be remembered from the discussion in connection with FIG. 2, corresponds to a transit time of 500 microseconds. The start of epoch signal is recognized by decoder 10 which generates a signal which is applied to and starts clock counter 22 which thereafter counts continuously, generating an output at the end of every 1500 microsecond interval which is applied through OR gate 34 to slot counter 40 which in accordance therewith counts the time slots.

The system having now been started will now attempt to synchronize itself in the normal manner as follows. The signal from decoder 10 has been also applied to latch 18 suitably a binary counter comprised of bistable elements which in response thereto generates a first trial signal on line 18a which is applied to AND gate 26. Fifteen microseconds after start of own slot clock counter 22 generates an output on line 22c which passing through qualified gate 42 triggers a station transmitter (not shown) to transmit a collision avoidance message. Additionally the own slot signal on line 40a which qualifies gate 42 also qualifies gate 12a. If a synchronization response is heard it is decoded in decoder 12 and applied to change the speed of synchronization counter 24 and to reset timer 20 in the manner previously described and additionally extinguishes the signal generated by latch 16 which is also suitably a bistable element. If, however, no synchronization response is received latch 16 continues to generate an output which is also applied to gate 26. Since no synchronization response has been received synchronization counter does not change speed and hence will count to a final count and then generate a control signal on line 24b which is applied to gates 26, 27 and 28. Since gate 26 is now qualified a signal passes therethrough and through gate 30 to reset and stop clock counter 22 and slot counter 40.

Upon the arrival of the next start of epoch signal, decoder 10 decodes the signal and applies another pulse to latch 18 thus causing this latch to generate a second trial signal along line 18b to AND gate 27. The start of epoch signal, of course, has once again started clock counter 22 which as before counts through the time slots to generated slot pulses which are accumulated in slot counter 40. Upon arrival of own slot, slot counter 40 output signal on line 40a and the clock counter output signal on line 22c which is generated 15 microseconds after start of own time slot again trigger the transmitter to transmit the collision avoidance message. If again no synchronization response is received synchronization counter 24 once again does not change speed but counts to a final count and generates a control signal over line 24b which passes through gate 27, which is now opened, and is applied to gates within counter 22 so as to advance it by the number of counts equal to 600 microseconds as previously explained. The output of gate 27 is also applied to latch 32, suitably another bistable element, which in response thereto qualifies AND gates 28 and 29. Since the time for own slot has now passed gate 29 remains closed but qualified. Clock counter 22 while advanced ignores subsequent start of epoch signals and continues to run until arrival of next own time slot, which, of course, has been advanced by 600 microseconds. The own slot signal appearing on line 40a passes through qualified gate 29 and is applied to clock counter 22 so as to increase the count to which this counter will count during this particular time slot to 21,725. Gate 29 output signal is also applied to synchronization counter 24 to disable the gates which detect the original 6725 count and to open a gate which will detect the count number 21,725. Additionally gates 36 and 38 are qualified. If a synchronization response is now received it is, as usual, applied to synchronization counter 24 in the normal manner, and additionally passes through gates 38 and 34 and causes slot count 40 to advance by one slot count. Additionally synchronization counter 24, in response to the synchronization response, changes speed and continues to count to 21,725 at which time it resets clocks counter 22 along line 24a and additionally generates a signal along 24b which is applied through gates 36 and 34 to once again advance slot counter 40 by one slot count. Thus, it should now be obvious that, since during this extended slot, the slot counter has been stepped twice, the slot counter as well as the clock counter is now synchronized with the rest of the collision avoidance network.

The aforementioned patent application "A Frequency Diversity Time Multiplex Means for Increasing the Capacity of a Cooperative Collision Avoidance System," Ser. No. 694,239 describes a means for stepping the frequency in adjacent time slots so as to provide isolation between these time slots and further describes a counter similar to slot counter 40 which selects the correct transmission frequency for the particular time slot. During the time that the system is reset in a listening mode, slot counter 40, it will be remembered, is reset and stopped at the first slot in the epoch. Since a frequency $f_1$ is assigned to the first time slot the slot counter will properly select this frequency. Additionally, while own time slot is extended the slot counter will continue to select the frequency associated with own time slot thus allowing the receiver to listen for synchronization responses during this extended time slot. Of course, during the extended time slot and once a synchronization response is received slot counter 40 steps to the next time slot thus stepping the system to listen on the next frequency. However, since the response has already been received, this is of no effect.

We have shown what we consider to be the preferred embodiment of our invention. However, following our teachings, certain alterations and modifications will become apparent to one skilled in the art, so that we do not wish to limit our invention to the specific form shown. Accordingly we hereby claim as our invention the subject matter including modifications and alterations thereof encompassed by the true scope and spirit of the appended claims.

We claim:

1. In a cooperative collision avoidance means for cooperating stations wherein each cooperating station is equipped with said collision avoidance means including: transmitter means for transmitting collision avoidance messages and requesting synchronization and receiver means for receiving synchronization responses during an own time slot in a system epoch, said epoch being divided into time slots and characterized by a start-of-epoch signal transmitted by predetermined of said stations; a clock counter including clock means for generating clock pulses and counting means for counting said clock pulses and for generating a first start signal at a first predetermined count during own time slot, a second start signal at a second predetermined count during other time slots and a slot pulse at a third predetermined count and additionally including means responsive to said slot pulse for resetting said counting means, said clock counter being responsive to a synchronizing signal for synchronizing said clock counter to a donor station; a slot counter responsive to slot pulses for generating an own slot signal during own time slot, said slot counter being responsive to a slot counter reset signal for being reset; a synchronization counter for counting said clock pulses when triggered by said first or second start signal for generating said synchronizing signal at a fourth predetermined count during own time slot and for generating a control signal at a fifth predetermined count; and, first decoder means responsive to a receiver first synchronization response for generating a change speed signal; an improvement for synchronizing a clock at an extended range from a donor clock and known to be late with respect to said donor clock comprising:

a first latch for generating a no synchronization response signal and responsive to said change speed signal for extinguishing said no synchronization response signal;

means responsive to said no synchronization signal and said control signal for generating an advance signal;

means responsive to said advance signal and said own slot signal for generating an extend slot signal;

means responsive to said advance signal for advancing said clock counter counting means a first predetermined number of counts;

means responsive to said extend slot signal for delaying generation of said clock counter slot pulse a second predetermined number of counts; and means for generating a double slot pulse.

2. The improvement recited in claim 1 wherein said means for generating a double slot pulse comprises:

first gating means responsive to said control signal and said extend slot signal for generating a first slot pulse; and second gating means responsive to said extend slot signal and said change speed signal for generating a second slot pulse, said first and second slot pulses comprising said double slot pulse.

3. The improvement recited in claim 1 with additionally timing means reset by said received synchronization responses for generating a first stop signal, said clock counter counting means and said slot counter being reset and stopped by stop signals.

4. The improvement recited in claim 3 wherein said clock counter counting means includes means responsive to a received start of epoch signal for starting said clock counter counting means.

5. The improvement recited in claim 1 with additionally:

a second latch responsive to received said start of epoch signals for generating first and second trial signals; and means responsive to said first trial and said no synchronization signal for generating a second stop signal, said clock counter counter means and said slot counter being reset and stopped by stop signals.

6. The improvement recited in claim 5 wherein said means for generating an advance signal is additionally responsive to said second trial signal.

7. The improvement recited in claim 1 with additionally means collectively responsive to said extend slot signal, said no synchronization signal and said control signal for generating a third stop signal, said clock counter counter means and said slot counter being reset and stopped by stop signals.

8. The improvement recited in claim 3 with additionally:

a second latch responsive to said start of epoch signals for generating first and second trial signals;

means collectively responsive to said first trial signal, sad said control signal and said no synchronization signal for generating a second stop signal; and means collectively responsive to said extend slot signal, said control signal and said second trial signal for generating a third stop signal.

9. The improvement recited in claim 8 wherein said first latch comprises a first bistable element reset by said first stop signal.

10. The improvement recited in claim 9 wherein said second latch comprises a plurality of bistable counting elements for sequentially generating said first and second trial signals in response to sequentially applied start of epoch signals, said counting elements being reset by said first stop signal.

11. The improvement recited in claim 10 wherein said means for generating an extend slot signal comprises a second bistable element reset by said stop signals.